United States Patent
Ogura et al.

(10) Patent No.: US 9,491,439 B2
(45) Date of Patent: Nov. 8, 2016

(54) THREE-DIMENSIONAL IMAGE CAPTURE DEVICE, LENS CONTROL DEVICE AND PROGRAM

(71) Applicant: Panasonic Corporation, Osaka (JP)

(72) Inventors: Motonori Ogura, Osaka (JP); Takanori Yabuki, Osaka (JP)

(73) Assignee: Panasonic Intellectual Property Management Co. Ltd., Osaka (JP)

( * ) Notice: Subject to any disclaimer, the term of this patent is extended or adjusted under 35 U.S.C. 154(b) by 352 days.

(21) Appl. No.: 14/156,721

(22) Filed: Jan. 16, 2014

(65) Prior Publication Data

US 2014/0132738 A1   May 15, 2014

Related U.S. Application Data

(63) Continuation of application No. PCT/JP2012/004926, filed on Aug. 2, 2012.

(30) Foreign Application Priority Data

Aug. 23, 2011   (JP) .................................. 2011-181251

(51) Int. Cl.
*H04N 13/02*   (2006.01)
*H04N 5/232*   (2006.01)
(Continued)

(52) U.S. Cl.
CPC ............ *H04N 13/0203* (2013.01); *G02B 7/02* (2013.01); *H04N 5/23251* (2013.01);
(Continued)

(58) Field of Classification Search
CPC .............. H02M 2001/322; H02M 2007/4835; H03K 17/102; G02B 27/646; G02B 7/02; H04N 13/0203; H04N 13/0239; H04N 13/0296; H04N 5/23251; H04N 5/23274; H04N 5/23287
See application file for complete search history.

(56) References Cited

U.S. PATENT DOCUMENTS 7,463,257 B2 * 12/2008 Martin ............... H04N 13/0011
                                                               345/419
8,279,267 B2 * 10/2012 Chen .................... H04N 13/021
                                                               348/49
(Continued)

FOREIGN PATENT DOCUMENTS

JP   2003-134534 A   5/2003
JP   2004-283613 A   10/2004
(Continued)

OTHER PUBLICATIONS

Notice of Reasons for Rejection for corresponding Japanese Application No. 2013-529854 dated Dec. 2, 2014, with partial English translation.
(Continued)

*Primary Examiner* — Shan Elahi
(74) *Attorney, Agent, or Firm* — Renner, Otto, Boisselle & Sklar, LLP

(57) ABSTRACT

A 3D image capture device includes: a first image capturing section including a first optical system and a first image sensor that outputs a first signal to generate a first image; a second image capturing section including a second optical system that has parallax with respect to the first optical system and a second image sensor that outputs a second signal to generate a second image that has parallax with respect to the first image; a point of convergence adjusting section configured to adjust the position of the point of convergence; a working range setting section configured to set working ranges for the image stabilization working according to the position of the point of convergence; and an image stabilizing section configured to cancel the camera shake within the set working ranges.

8 Claims, 13 Drawing Sheets

(51) Int. Cl.
*G02B 7/02* (2006.01)
*G02B 27/64* (2006.01)

(52) U.S. Cl.
CPC ..... *H04N 5/23274* (2013.01); *H04N 5/23287* (2013.01); *H04N 13/0239* (2013.01); *H04N 13/0296* (2013.01); *G02B 27/646* (2013.01)

(56) References Cited

U.S. PATENT DOCUMENTS

| | | | | |
|---|---|---|---|---|
| 8,860,827 | B2* | 10/2014 | Yamamoto | G03B 5/00 348/208.11 |
| 2006/0023197 | A1* | 2/2006 | Joel | G03B 35/24 355/77 |
| 2007/0081716 | A1* | 4/2007 | Ha | H04N 13/0018 382/154 |
| 2011/0025825 | A1* | 2/2011 | McNamer | H04N 13/0221 348/46 |
| 2012/0019623 | A1* | 1/2012 | Kokuwa | G02B 7/38 348/47 |
| 2012/0044373 | A1* | 2/2012 | Shiozaki | G03B 35/08 348/218.1 |
| 2012/0188343 | A1* | 7/2012 | Matsuura | H04N 13/0221 348/46 |
| 2013/0147920 | A1* | 6/2013 | Kobayashi | G02B 7/38 348/46 |

FOREIGN PATENT DOCUMENTS

| | | |
|---|---|---|
| JP | 2005-045328 A | 2/2005 |
| JP | 2008-028900 A | 2/2008 |
| JP | 2010-103895 A | 5/2010 |
| JP | 2011-124932 A | 6/2011 |
| JP | 2012-27344 A | 2/2012 |

OTHER PUBLICATIONS

International Search Report for corresponding International Application No. PCT/JP2012/004926, mailed Oct. 30, 2012.
Chinese Office Action and Search Report (with English translation) dated Mar. 23, 2016 for corresponding Chinese Application No. 201280027087.0.

* cited by examiner

FIG.3
(a) 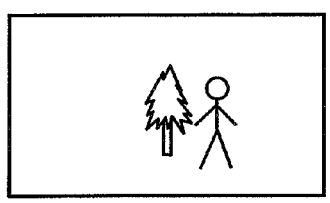
(b) 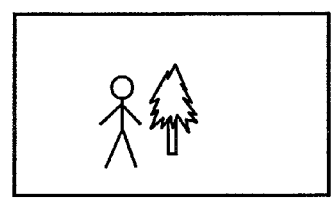
(c) 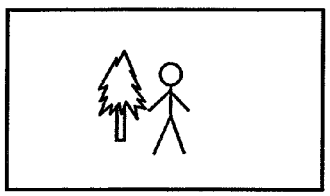
(d) 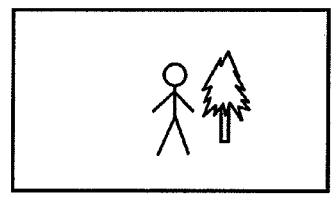
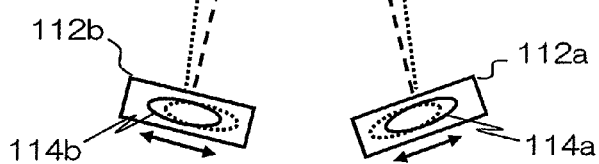

*FIG.11*

| IMAGE STABILIZATION / POINT OF CONVERGENCE ADJUSTMENT | OPTICAL (LENS SHIFTING) | OPTICAL (SENSOR SHIFTING) | ELECTRONIC | OPTICAL (LENS SHIFTING) + ELECTRONIC | OPTICAL (SENSOR SHIFTING) + ELECTRONIC |
|---|---|---|---|---|---|
| OPTICAL (LENS SHIFTING) | A | – | – | – | – |
| OPTICAL (SENSOR SHIFTING) | – | B | – | – | – |
| ELECTRONIC | – | – | C | – | – |
| OPTICAL (LENS SHIFTING) +ELECTRONIC | – | – | – | D | – |
| OPTICAL (SENSOR SHIFTING) +ELECTRONIC | – | – | – | – | E |

THREE-DIMENSIONAL IMAGE CAPTURE DEVICE, LENS CONTROL DEVICE AND PROGRAM

This is a continuation of International Application No. PCT/JP2012/004926, with an international filing date of Aug. 2, 2012, which claims priority of Japanese Patent Application No. 2011-181251, filed on Aug. 23, 2011, the contents of which are hereby incorporated by reference.

BACKGROUND

1. Technical Field

The present disclosure relates to a technology for getting multiple images with parallax by capturing images from a plurality of different viewpoints.

2. Description of the Related Art

According to a known technology, right- and left-eye images with parallax are obtained by capturing and are displayed on a display device which can project those images to the left and right eyes of a viewer independently of each other, thereby reproducing a three-dimensional (3D) image. In shooting such a three-dimensional image, the angle of convergence (i.e., the position of the point of convergence) is suitably changeable in order to express parallax just as intended by the shooter.

As a technique for changing the angle of convergence, Japanese Laid-Open Patent Publication No. 2010-103895 (hereinafter called "Patent Document No. 1") discloses a digital camera which cancels a camera shake while carrying out angle of convergence bracketing shooting. Specifically, the digital camera disclosed in Patent Document No. 1 includes a plurality of image capturing means and camera shake canceling means gets controlled by each of those image capturing means, thereby sequentially capturing images while changing the angle of convergence and getting multiple images. As a result, the user can choose a stereoscopic image that he or she finds best. Japanese Laid-Open Patent Publication No. 2011-124932 (hereinafter called "Patent Document No. 2") also discloses an image capture device which generates three-dimensional video by adjusting the point of convergence.

SUMMARY

To express the parallax just as intended by the shooter, not only the point of convergence is suitably changeable but also the camera shake is suitably cancellable even more appropriately.

The present disclosure provides a technique for changing the point of convergence and canceling the camera shake more appropriately than in the related art.

A 3D image capture device according to the present disclosure adjusts a point of convergence and working ranges of image stabilization. The 3D image capture device includes first and second image capturing sections, a point of convergence adjusting section configured to adjust a position of a point of convergence, a working range setting section configured to set working ranges for the image stabilization according to the position of the point of convergence, and an image stabilizing section configured to cancel a camera shake within the working ranges that have been set. The first image capturing section includes a first optical system and a first image sensor that outputs a first signal to generate a first image. The second image capturing section includes a second optical system that has parallax with respect to the first optical system and a second image sensor that outputs a second signal. The point of convergence adjusting section is configured to adjust the position of the point of convergence by performing at least one of an optical shifting operation and an electronic shifting operation. The optical shifting operation is to shift at least one of the first optical system and the first image sensor, and at least one of the second optical system and the second image sensor. The electronic shifting operation is to shift cropped areas that are extracted from images represented by the first signal and the second signal. The image stabilizing section is configured to perform, within the set working ranges, at least one of the optical image stabilization and the electronic image stabilization. The optical image stabilization is worked by shifting at least one of the first optical system and the first image sensor, and at least one of the second optical system and the second image sensor. The electronic image stabilization is worked by shifting the cropped areas that have been extracted from the images represented by the first signal and the second signal.

With an image capture device, lens control device and program according to the present disclosure, the point of convergence can be changed and the camera shake can be canceled more appropriately than in the related art.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 3 is a schematic representation illustrating generally how to adjust the point of convergence.

FIG. 11 is a table showing exemplary possible combinations of point of convergence adjustment and image stabilization methods.

DETAILED DESCRIPTION

Hereinafter, embodiments will be described in detail with reference to the accompanying drawings as needed. It should be noted that the description thereof will be sometimes omitted unless it is absolutely necessary to go into details. For example, description of a matter that is already well known in the related art will be sometimes omitted, so will be a redundant description of substantially the same configuration. This is done solely for the purpose of avoiding redundancies and making the following description of embodiments as easily understandable for those skilled in the art as possible.

It should be noted that the present inventors provide the accompanying drawings and the following description to help those skilled in the art understand the present disclosure fully. And it is not intended that the subject matter defined by the appended claims is limited by those drawings or the description.

Before specific embodiments are described, the basic configuration of those embodiments will be described first.

Figure 1A:
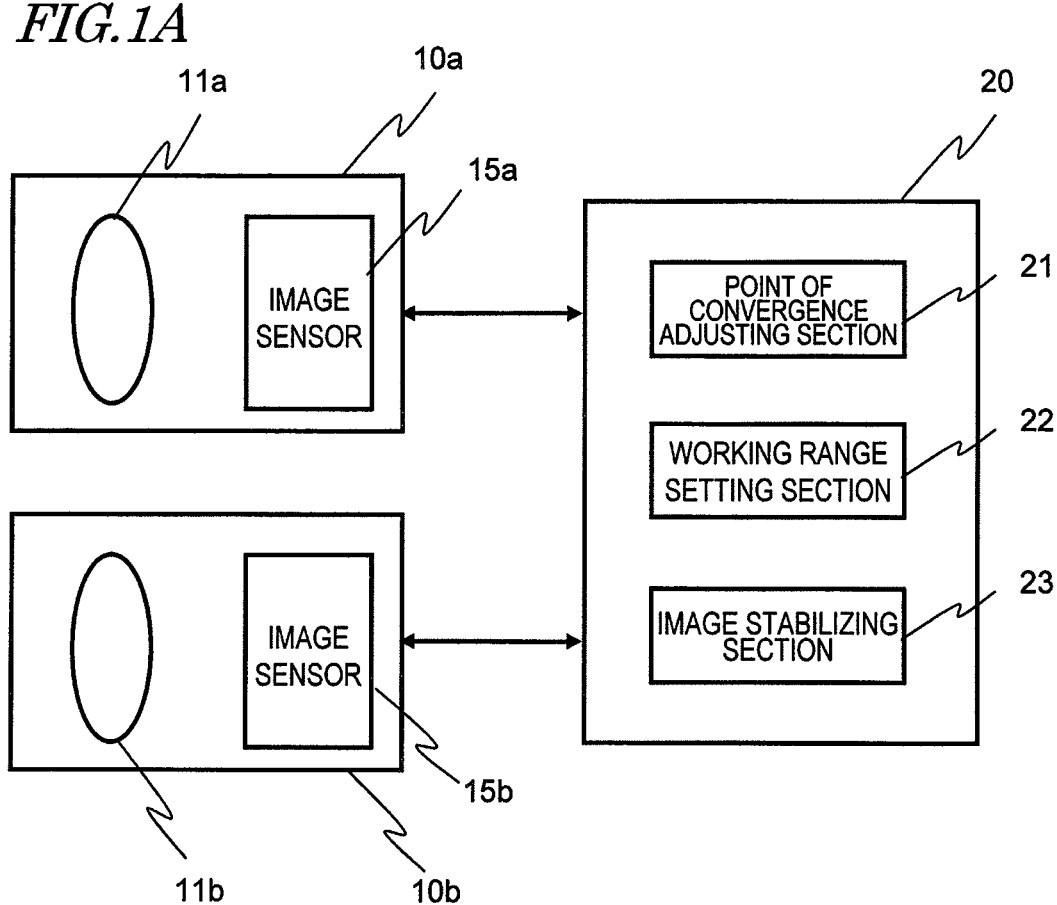
FIG. 1A is a block diagram illustrating a basic configuration for an embodiment.

FIG. 1A is a block diagram illustrating a basic configuration for a 3D image capture device (which will be simply referred to herein as an "image capture device"). This image capture device has the function of adjusting the point of convergence and the function of canceling a camera shake. This image capture device includes two image capturing sections 10a and 10b, each of which outputs an image signal to generate a 3D image by capturing, and a control section 20 which controls these image capturing sections 10a and 10b. Each of these image capturing sections 10a and 10b includes an optical system 11a, 11b and an image sensor 15a, 15b. The image sensor 15a, 15b outputs an image signal to generate a 3D image by capturing. The control section 20 controls the operations of the image capturing sections 10a and 10b and performs necessary image processing, thereby generating a 3D image.

The control section 20 includes a point of convergence adjusting section 21 which adjusts the point of convergence to be determined by a pair of images that have been obtained by the image capturing sections 10a and 10b, an image stabilizing section 23 which cancels a camera shake, and a working range setting section 22 which sets image stabilization working ranges with respect to the position of the point of convergence. Thanks to the action of the working range setting section 22, the camera shake can be canceled more appropriately as will be described later.

As will be described later, the image capturing sections 10a and 10b may have any of various configurations and the point of convergence adjusting section 21 and the image stabilizing section 23 may perform any of various control methods. However, no matter which of those embodiments is adopted, the camera shake can always be canceled more appropriately by controlling the image stabilization working ranges according to the position of the point of convergence. Hereinafter, specific embodiments will be described.

Embodiment 1

First of all, a digital camcorder will be described as a first embodiment with reference to the accompanying drawings.

<1-1. Configuration for Digital Camcorder>

A configuration for a digital camcorder according to this embodiment will now be described.

Figure 1B:
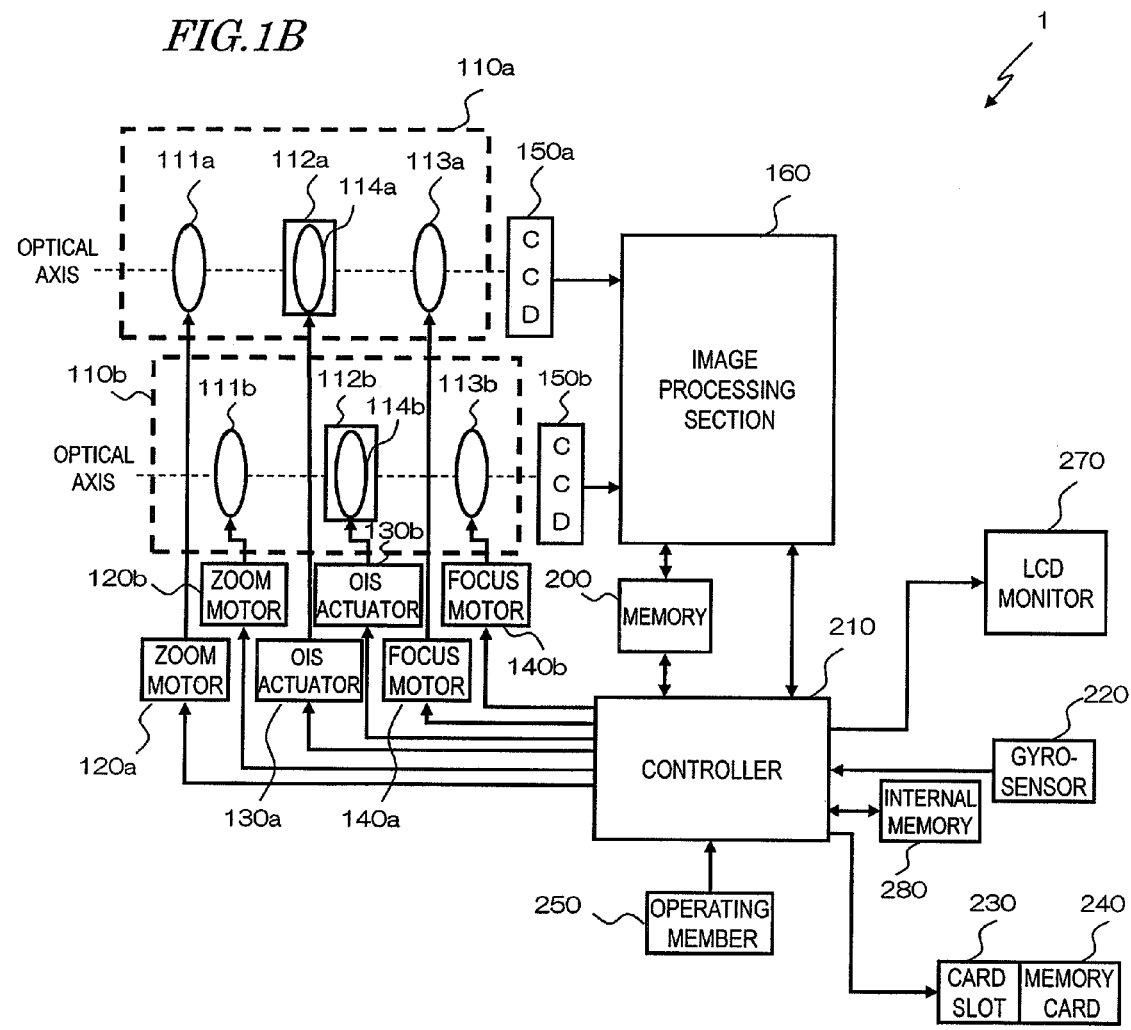
FIG. 1B is a block diagram illustrating an electrical configuration for a digital camcorder 1 according to a first embodiment.
Figure 12:
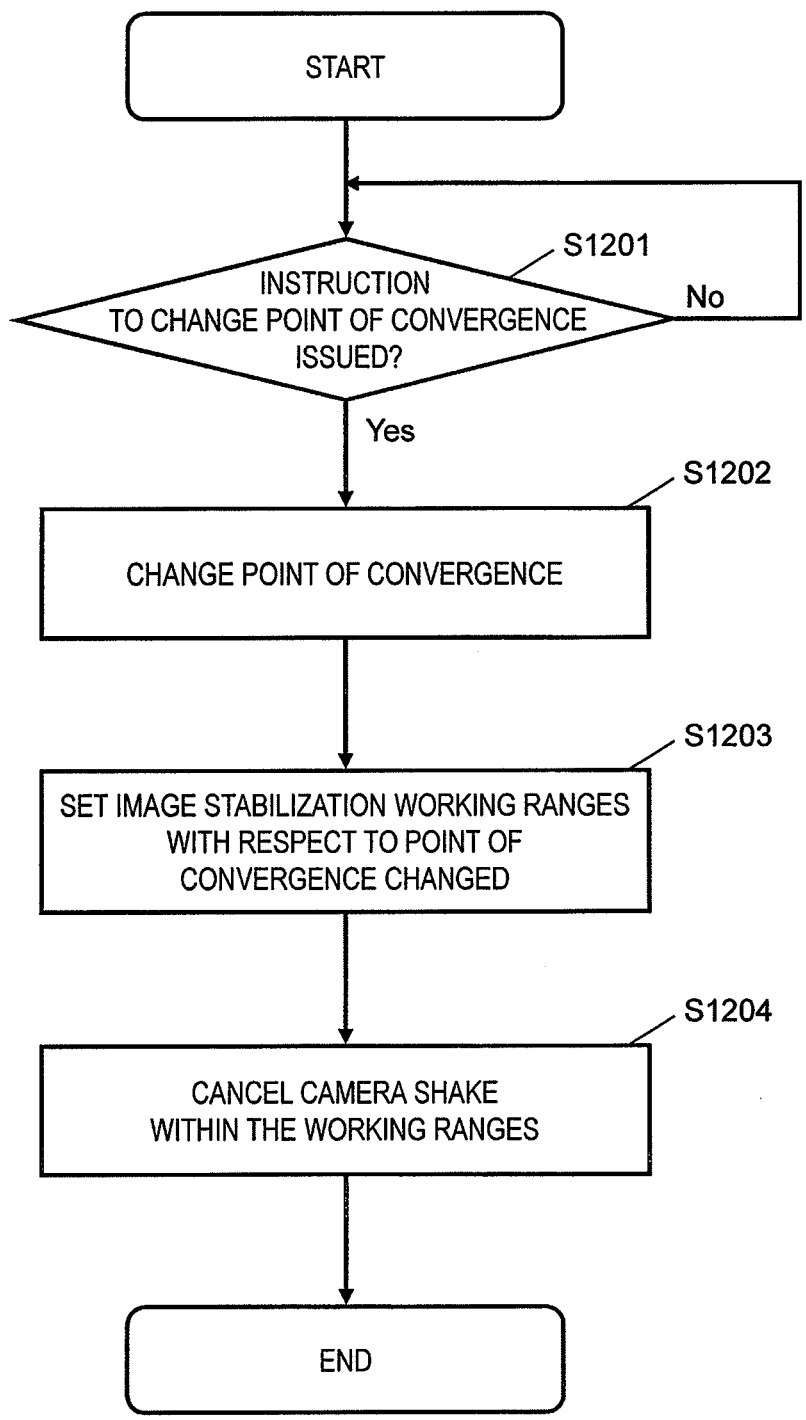
FIG. 12 is a flowchart showing the procedure of operation of setting image stabilization working ranges according to the position of a point of convergence.

FIG. 12 is a block diagram illustrating a physical configuration for a digital camcorder 1 according to this embodiment. In FIG. 1B, the arrows indicate how respective components of this digital camcorder 1 are electrically connected together. This digital camcorder 1 includes optical systems 110a and 110b, zoom motors 120a and 120b, OIS actuators 130a and 130b, focus motors 140a and 140b, CCD image sensors 150a and 150b, an image processing section 160, a memory 200, a controller 210, a gyrosensor 220, a card slot 230, a memory card 240, an operating member 250, an LCD monitor 270, and an internal memory 280.

The optical system 110a includes a zoom lens 111a, an OIS (optical image stabilizer) 112a, and a focus lens 113a. Likewise, the optical system 110b also includes a zoom lens 111b, an OIS 112b, and a focus lens 113b. The optical system 110a produces a subject image as viewed from a first viewpoint on the image capturing plane of the COD image sensor 150a. Meanwhile, the optical system 110b produces a subject image as viewed from a second viewpoint, which is different from the first viewpoint, on the image capturing plane of the CCD image sensor 150b. In FIG. 1B, the respective optical axes of the optical systems 110a and 110b are illustrated as being parallel to each other. Actually, however, these optical systems 110a and 110b are inwardly tilted so that their optical axes intersect each other at a point.

By moving the zoom lenses 111a and 111b along the optical axes of the optical systems 110a and 110b, respectively, the subject images produced on the CCD image sensors 150a and 150b can be either zoomed in on or zoomed out. The zoom lenses 111a and 111b are controlled by the zoom motors 120a and 120b, respectively. Each of the zoom lenses 110a and 110b is illustrated in FIG. 1B as a single lens for the sake of simplicity, but is typically a combination of multiple lenses.

Each of the OIS's 112a and 112b includes an image stabilizer lens 114a, 114b which can move internally within a plane that intersects with the optical axis at right angles. Specifically, the OIS's 112a and 112b respectively drive the image stabilizer lenses 114a and 114b in such a direction as cancel the shake of the digital camcorder 1 during shooting, thereby reducing the shakiness (i.e., motion blur) of the subject image. Also, according to this embodiment, by shifting the respective image stabilizer lenses 114a and 114b of the OIS's 112a and 112b either toward their center or outward, the point of convergence can be adjusted so as to be located more distant from, or closer to, the digital camcorder 1. In this description, the point of convergence refers herein to the intersection between the paths of two light rays that have been incident on the CCD 150a along the optical axes of the focus lenses 113a and 113b (i.e., the point of emittance). Also, the angle formed between those two paths of the light rays at the point of convergence will be referred to herein as the "angle of convergence".

If the point of convergence is located at a reference position (unless the respective center positions of the image stabilizer lenses 114a and 114b have shifted from their default positions (that are the respective centers of the OIS's 112a and 112b), the image stabilizer lenses 114a and 114b can move within the distance a from their default positions inside the OIS's 112a and 112b, respectively. On the other hand, if the center positions of the image stabilizer lenses 114a and 114b have shifted from their default positions in order to adjust the point of convergence, the image stabilization working ranges are changed according to the magnitude of that shift. In this description, the "working ranges" of image stabilization refer herein to respective parts of the ranges in which the image stabilizer lenses 114a and 114b are physically movable (which will be sometimes referred to herein as "movable ranges") and in which their movement is limited by the controller 210. As can be seen, according to this embodiment, the camera shake is canceled by shifting the image stabilizer lenses 114a and 114b during shooting within the working ranges that have been set by the controller 210. It will be described in detail later how to change the image stabilization working ranges of the image stabilizer lenses 114a and 114b when the point of convergence is adjusted. The OIS's 112a and 112b are driven by the OIS actuators 130a and 130b, respectively. Each of the image stabilizer lenses 114a and 114b is illustrated as a single lens in FIG. 1B but may also be a combination of multiple lenses.

By moving the focus lenses 113a and 113b along the optical axes of the optical systems 110a and 110b, respectively, the focuses of the subject images to be produced on the respective image capturing planes of the CCD image sensors 150a and 150b are adjusted. The focus lenses 113a and 113b are controlled by the focus motors 140a and 140b, respectively. Each of the focus lenses 113a and 113b is illustrated as a single lens in FIG. 1B but may also be a combination of multiple lenses.

In the following description, these optical systems 110a and 110b will be sometimes collectively referred to herein as an "optical system". The same can be said about the zoom lenses 111, OIS's 112, image stabilizer lenses 114, focus lenses 113, zoom motors 120, OIS actuators 130, focus motors 140 and CCD image sensors 150.

The zoom motors 120a and 120b drive and control the zoom lenses 111a and 111b, respectively. The zoom motors 120a and 120b may be implemented as pulse motors, DC motors, linear motors or servo motors, for example. If necessary, the zoom motors 120a and 120b may drive the zoom lenses 111a and 111b via a cam mechanism, a ball screw, or any other appropriate mechanism. Optionally, the optical systems 110a and 110b may be configured to control the zoom lenses 111a and 111b synchronously using a common drive mechanism.

The OIS actuators 130a and 130b drive and control the image stabilizer lenses 114a and 114b in the OIS's 112a and 112b, respectively, within planes that intersect with their optical axes at right angles. The OIS actuators 130a and 130b may be implemented as planar coils or ultrasonic motors, for example.

The focus motors 140a and 140b drive and control the focus lenses 113a and 113b, respectively. The focus motors 140a and 140b may be implemented as pulse motors, DC motors, linear motors or servo motors, for example. If necessary, the focus motors 140a and 140b may drive the focus lenses 113a and 113b via a cam mechanism, a ball screw, or any other appropriate mechanism.

The CCD image sensors 150a and 150b photoelectrically convert the subject images that have been produced by the optical systems 110a and 110b, thereby outputting electrical signals. In the following description, those electrical signals output by the CCD image sensors 150a and 150b will be sometimes referred to herein as a "first viewpoint signal" and a "second viewpoint signal", respectively. The CCD image sensors 150a and 150b perform various kinds of operations including exposure, transfer and electronic shuttering that need to be done for shooting. Optionally, the CCD image sensors may be replaced with any other kind of image sensors such as CMOS image sensors.

The image processing section 160 subjects the first and second viewpoint signals that have been generated by the CCD image sensors 150a and 150b to various kinds of processing. For example, the image processing section 160 processes the first and second viewpoint signals, thereby generating either image data to be displayed on the LCD monitor 270 (which will be referred to herein as a "review image") or image data to be stored back into the memory card 240 again. For instance, the image processing section 160 may subject the first and second viewpoint signals to gamma correction, white balance correction, flaw correction and various other sorts of image processing.

In addition, in performing 3D image processing, the image processing section 160 also carries out cropping (or extraction) processing on the first and second viewpoint signals. If there were a vertical shift between the first and second viewpoint signals that form a 3D image, the viewer would find such a 3D image unnatural. However, by correcting the vertical cropping position, such unnaturalness can be reduced. In this manner, a 3D image is generated based on a pair of image areas that have been cropped from the first and second viewpoint signals (i.e., cropped areas). Optionally, the image processing section 160 may have the function of performing electronic zooming by increasing or decreasing the size of the cropped area.

Furthermore, the image processing section 160 compresses the first and second viewpoint signals that have been processed as described above in compression formats that are compliant with a predetermined file system standard. Then, two compressed image signals that have been obtained by compressing the first and second viewpoint signals are written on the memory card 240 so as to be associated with each other. Also, if the image signals to compress are moving pictures, then a moving picture compression standard such as H. 264 or MPEG4 AVC is applied. Optionally, data in the MPO file format in which two sets of image data are saved so as to be associated with each other and either a JPEG image or an MPEG moving picture may be written simultaneously.

The image processing section 160 may be implemented as a digital signal processor (DSP) or a microcontroller (or microcomputer). The resolution (i.e., number of pixels) of the review image may be set to be either the screen resolution of the LCD monitor 270 or the resolution of image data that has been generated by being compressed in a compression format compliant with the JPEG standard.

The memory 200 functions as a work memory for the image processing section 160 and the controller 210. The memory 200 temporarily stores either the image signal that has been processed by the image processing section 160 or the image data supplied from the CCD image sensor 150 before being processed by the image processing section 160. In addition, the memory 200 temporarily stores information indicating a shooting condition on the optical systems 110a and 110b and on the CCD image sensors 150a and 150b during shooting. Examples of the shooting condition include a subject distance, angle of view information, ISO sensitivity, a shutter speed, an EV value, an F number, a lens to lens distance, a shooting timestamp, the magnitude of OIS shift at a position corresponding to that of the point of convergence, and the image stabilization working ranges (including the magnitudes of permissible shift of the OIS's). The memory 200 may be implemented as a DRAM or a ferroelectric memory.

The internal memory 280 may be implemented as a flash memory or a ferroelectric memory, for example, and may store a control program for controlling the overall digital camcorder 1, for example.

The controller 210 performs an overall control on this digital camcorder 1. The controller 210 may be implemented as either only a single piece of hardware or a combination of hardware and software. For example, the controller 210 could be a microcomputer.

The gyrosensor 220 may be implemented as a kind of vibrating member such as a piezoelectric transducer. Specifically, the gyrosensor 220 vibrates the vibrating member such as a piezoelectric transducer at a constant frequency and transforms the Coriolis force produced into a voltage, thereby obtaining angular velocity information. Then, the controller 210 gets the angular velocity information from the gyrosensor 220 and gets the image stabilizer lenses 114 driven in the OIS's 112 in such a direction that will cancel that shake. As a result, the shake of the digital camcorder 1 that has been generated by the user's hand or body tremors can be canceled.

The card slot 230 is an interface to/from which the memory card 240 is readily attachable and removable. The card slot 230 is connectible both mechanically and electrically to the memory card 240.

The memory card 240 includes an internal memory such as a flash memory or a ferroelectric memory and can store data. On the memory card 240 connected to the card slot 230, 3D video or still picture that has been shot can be written. It should be noted that the memory card 240 does not form an integral part of the camcorder 1.

The operating member 250 is a generic term which collectively refers to various user interfaces which accept a user's instruction. For example, the operating member 250 may include a user setting button, an operating dial and a recording start button which accept the user's instructions.

The user setting button is a button which can get associated with any particular one of the various functions of the digital camcorder 1 in accordance with a user's direct instruction or designation. For example, this digital camcorder 1 has a macro shooting mode as one of its functions. That is why if the user setting button has gotten associated with the macro shooting mode function in advance, then the user can change the modes of the digital camcorder 1 directly into the macro shooting mode simply by pressing down the user setting button. In addition, the digital camcorder 1 further has the function of changing the shooting conditions immediately into the one that is suited to the subject distance that has been set arbitrarily by the user. Thus, if the user setting button has gotten associated with this function in advance, then the user can change the shooting conditions directly into the one that is best suited to the subject distance that has been set just by pressing down the user setting button.

The operating dial is an operating member which is used to adjust various kinds of parameters by accepting the turn of the dial by the user. By turning and operating this dial, he or she can adjust an F number, a shutter speed, a focus position and the position of the point of convergence, for example, according to the angle of that rotation.

The recording start button accepts the user's instruction and starts recording a movie by being pressed down by him or her when this digital camcorder 1 is ready to start a shooting session. In addition, the recording start button also has the function of stopping recording a movie by being pressed down by him or her while this digital camcorder 1 is recording the movie.

The LCD monitor 270 is a display device which can make a 2D or 3D display of the first and second viewpoint signals that have been generated by the CCD image sensors 150 or the first and second viewpoint signals that have been read from the memory card 240. The LCD monitor 270 can also display various kinds of setting information about the digital camcorder 100. For example, the LCD monitor 270 can display pieces of setting information including an EV value, an F number, a shutter speed, an ISO sensitivity, and the position of the point of convergence, which are a number of parameters that form the shooting condition during the shooting session.

In this embodiment, the combination of the optical system 110a and the CCD image sensor 150a functions as a first image capturing section, and the combination of the optical system 110b and the CCD image sensor 150b functions as a second image capturing section. Also, the combination of the OIS actuators 130a and 130b and the controller 210 functions as a point of convergence adjusting section and an image stabilizing section, and the controller 210 functions as a working range setting section.

<1-2. Operation>

Hereinafter, it will be described with reference to FIGS. 2A through 7 how this digital camcorder 1 controls the point of convergence and how the digital camcorder 1 changes the image stabilization working ranges as the point of convergence is controlled.

Figure 2A:
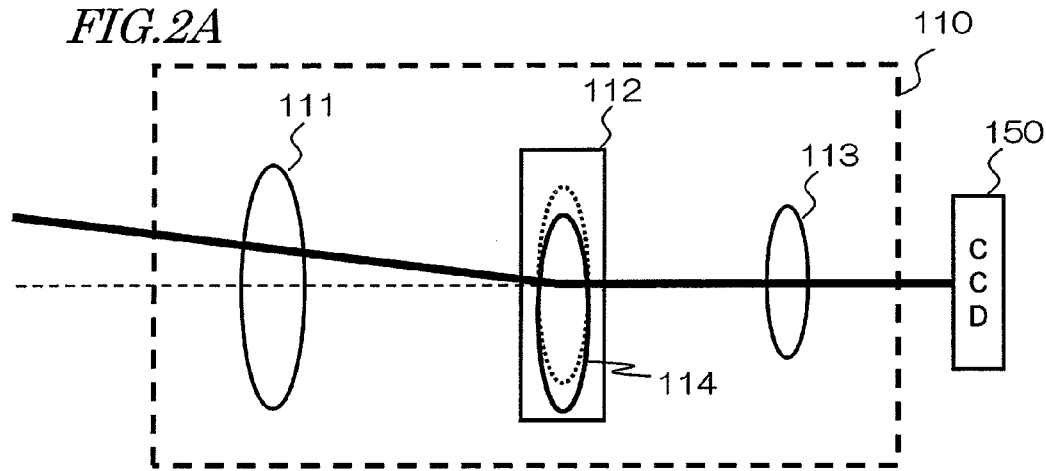
FIG. 2A is a schematic representation illustrating how an image stabilizer lens works.
Figure 2B:
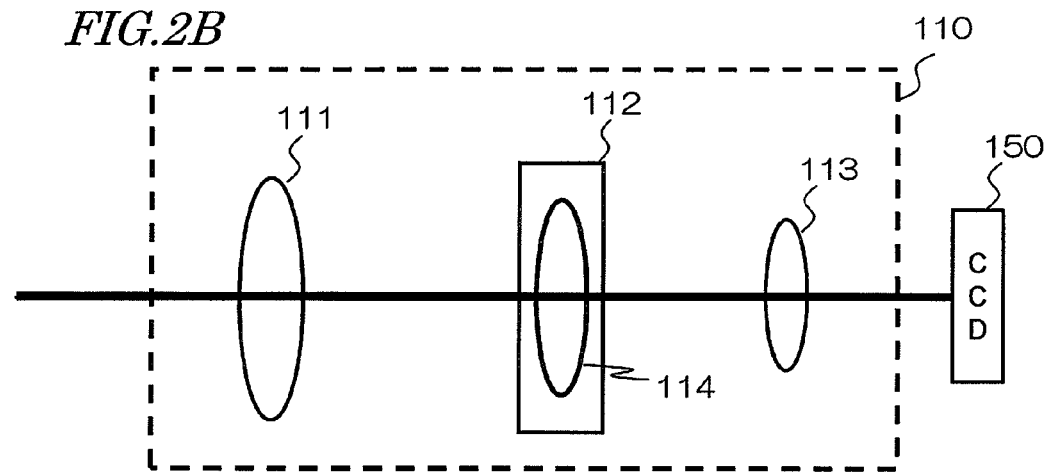
FIG. 2B is another schematic representation illustrating how the image stabilizer lens works.
Figure 2C:
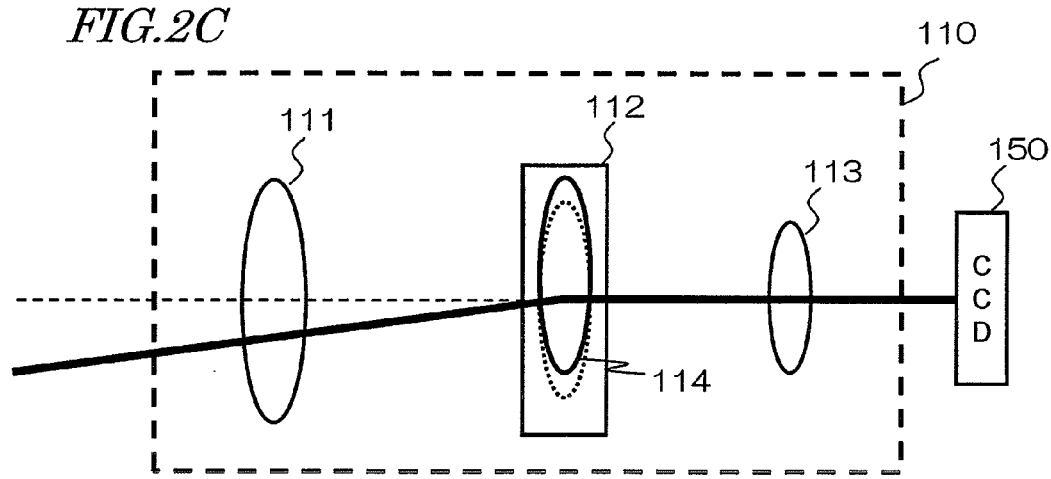
FIG. 2C is still another schematic representation illustrating how the image stabilizer lens works.

FIGS. 2A to 2C are schematic representations illustrating how the image stabilizer lens 114 works in the OIS 112. Specifically, FIGS. 2A to 2C illustrate the paths of a light ray which travels along the optical axis of the focus lens 113 and is incident perpendicularly onto the CCD image sensor 150 when the image stabilizer lens 114 is located at one end, at the middle position, and at the other ends, respectively. By shifting the image stabilizer lens 112 perpendicularly to the optical axis, the light ray that travels along the optical axis of the focus lens 113 and is incident onto the CCD image sensor 150 changes its path as shown in these drawings. That is why if both of the two image stabilizer lenses 114a and 114b are shifted either inward or outward, the position of the point of convergence can be moved back and forth. Also, if the image stabilizer lens 114 is shifted so as to cancel the camera shake during a shooting session, the motion blur of the image produced on the image capturing plane of the CCD image sensor 150 can be reduced.

FIG. 3 is a schematic representation illustrating how the point of convergence changes as the image stabilizer lenses 114a and 114b are shifted. In FIG. 3, only the OIS's 112a and 112b are illustrated among various components of the digital camcorder 1 for the sake of convenience. In this example, suppose a person and a tree which is located behind him or her are going to be shot. Portions (a) and (b) of FIG. 3 illustrate a left-eye image and a right-eye image, respectively, when the point of convergence is located on the tree. On the other hand, portions (c) and (d) of FIG. 3 illustrate a left-eye image and a right-eye image, respectively, when the point of convergence is located on the person. In this example, as the image stabilizer lenses 114a and 114b are shifted from the positions indicated by the solid ellipses to the positions indicated by the dotted ellipses in FIG. 3, the point of convergence is supposed to move from the person to the tree. That is why if the user turns the operating dial to move the point of convergence from the person to the tree, the image stabilizer lenses 114a and 114b move from the solid ellipse positions to the dotted ellipse positions, and the images produced on the image capturing planes of the CCD image sensors 150a and 150b shift horizontally. As a result, the subject, of which the parallax between the left- and right-eye images is zero, changes from the person into the tree. By performing this operation, an adjustment can be made so that the degree of depth of the person increases but that of the tree decreases. Such an adjustment of the point of convergence can be made not only before the images are shot but also while a moving picture is being shot as well.

If a shooting instruction is given after the point of convergence has been adjusted as described above, the digital camcorder 1 records video while canceling the camera shake to be caused during shooting. The controller 210 gets the direction and magnitude of the camera shake detected by the gyrosensor 220 during shooting, and controls the OIS actuator 130 so as to cancel the shake. As a result, deterioration of the image due to the influence of the camera shake during shooting can be minimized. In this case, the image stabilization working ranges are controlled according to the position of the point of convergence as described above.

Hereinafter, it will be described exactly how to control the image stabilization working ranges in this embodiment according to the position of the point of convergence.

Figure 4:
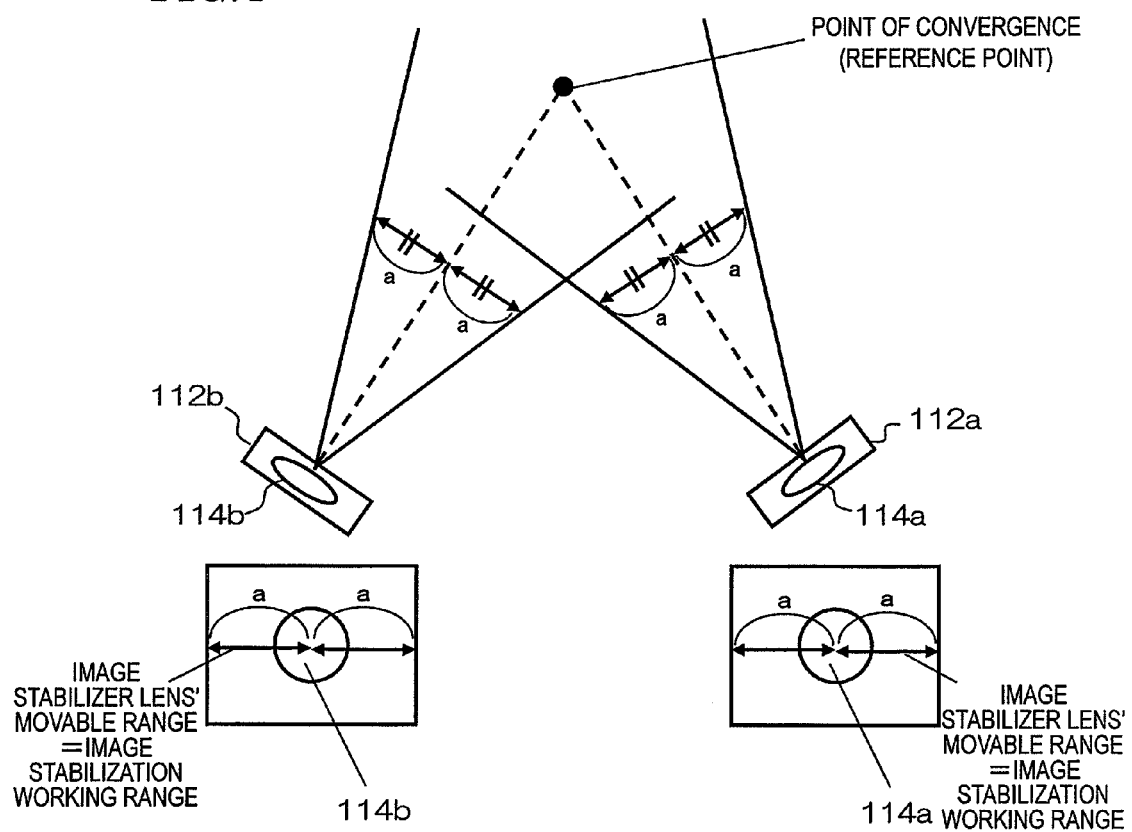
FIG. 4 illustrates conceptually the movable ranges of left and right image stabilizer lenses and their image stabilization working ranges when the point of convergence is located at a reference point.

FIG. 4 illustrates conceptually the movable ranges of the right and left image stabilizer lenses 114a and 114b and their image stabilization working ranges when the point of convergence is located at a reference point. In FIG. 4, no components other than the OIS's 112a and 112b are illustrated, either, for the sake of convenience. Also, in FIG. 4, not only the movable ranges of the image stabilizer lenses 114a and 114b but also the magnitudes of shift of the light rays that travel along the optical axes of the focus lenses 113a and 113b and are incident on the CCD image sensors 150 as the image stabilizer lenses 114a and 114b move are identified by the same reference sign a for convenience sake. Since the optical systems 110a and 110b including the OIS's 112a and 112b, respectively, are arranged so as to tilt inward, their optical axes intersect with each other at the point of convergence.

In this description, the "reference point" refers herein to the point of convergence when the respective center positions of the image stabilizer lenses 114a and 114b of the OIS's 112a and 112b are located on the respective optical axes of the optical systems 110a and 110b. In this case, the range in which each of the image stabilizer lenses 114a and 114b can move to cancel the camera shake (which will be referred to herein as a "movable range") is horizontally symmetric with respect to the center position of that image stabilizer lens 114a, 114b as shown at the bottom of FIG. 4. That is to say, the movable range of the image stabilizer lens 114a (i.e., the right lens) is defined by the distance a from the center position of the image stabilizer lens 114a both on the right- and left-hand sides. In the same way, the movable range of the image stabilizer lens 114b (i.e., the left lens) is also defined by the distance a from the center position of the image stabilizer lens 114b both on the right- and left-hand sides.

If a camera shake needs to be canceled using multi-lens optical systems as in the digital camcorder 1 of this embodiment, the ranges of camera shakes that can be canceled by the right and left image stabilizer lenses 114a and 114b need to agree with each other. In a situation where the ranges of camera shakes that can be canceled by the right and left image stabilizer lenses 114a and 114b disagreed with each other, if a camera shake that can be canceled with an image stabilizer lens associated with one eye but that cannot be canceled with an image stabilizer lens associated with the other eye had been produced, inconveniences would be caused. That is to say, in that case, even though the image obtained through the one image stabilizer lens would be affected little by the camera shake, the image obtained through the other image stabilizer lens would be much affected by the camera shake, which is inconvenient. And if such left- and right-eye images that are affected by the camera shake to mutually different degrees (i.e., blurred to different degrees) were synthesized together to produce a 3D image, then it would be difficult for the viewer to sense the synthetic image thus obtained as a 3D image. For that reason, to get the left- and right-eye images affected by a camera shake to the same degree, the digital camcorder 1 of this embodiment controls the right and left image stabilizer lenses 114a and 114b so that their image stabilization working ranges agree with each other.

In the state shown in FIG. 4, the image stabilizer lenses 114a and 114b (i.e., right and left lenses) of the OIS's 112a and 112b both have their movable ranges defined by the same distance a both to the right and to the left. That is why in the state shown in FIG. 4, each of the image stabilizer lenses 114a and 114b (right and left lenses) is controlled so that their image stabilization working range agrees with their movable range.

By performing the operation described above, the digital camcorder 1 of this embodiment can cancel the camera shake appropriately when the point of convergence is located at the reference point.

Figure 5:
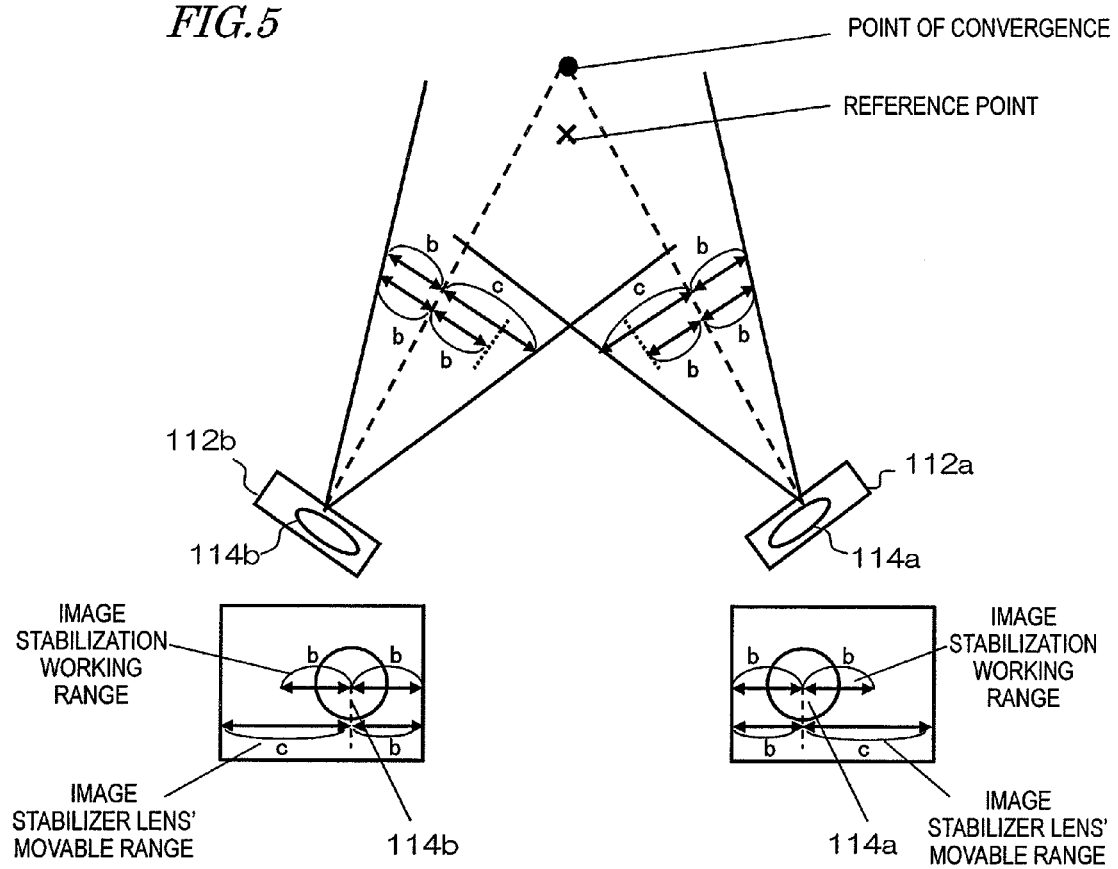
FIG. 5 illustrates conceptually the movable ranges of the left and right image stabilizer lenses and their image stabilization working ranges when the point of convergence is located more distant than the reference point is.

FIG. 5 illustrates conceptually the movable ranges of the right and left image stabilizer lenses 114a and 114b and their image stabilization working ranges when the point of convergence is located more distant than the reference point is.

By turning the operating dial in the shooting mode, the user can move the point of convergence to beyond the reference point. By moving the point of convergence in accordance with his or her instruction, the digital camcorder 1 can adjust the stereoscopic impression of a 3D image to be produced based on the left- and right-eye images. If the subject is located at the point of convergence, no parallax will be produced on the 3D image. That is why this operation can be said to be the operation of changing the subjects to produce no parallax on the 3D image from a subject located at the reference point into a subject located deeper than the reference point. By performing this operation, a subject which is located closer to the sensor than the reference point is can be sensed to be even more projecting.

In adjusting the point of convergence, the controller 210 receives a user's instruction through the operating dial, and sends a control signal instructing that the image stabilizer lenses 114 be shifted to the OIS actuator 130. By shifting the image stabilizer lenses 114 in accordance with the control signal, the OIS actuator 130 changes the position of the point of convergence. In changing the position of the point of convergence, the controller 210 also changes the image stabilization working ranges with the movement of the point of convergence. In the example described above, the controller 210 is supposed to send a control signal instructing that the image stabilizer lenses 114 be shifted to the OIS actuator 130 in accordance with the user's instruction that has been entered through the operating dial. However, this is just an example. Alternatively, when a predetermined situation arises, the controller 210 may decide by itself to send such a control signal instructing that the image stabilizer lenses 114 be shifted to the OIS actuator 130.

As shown in FIG. 5, if the point of convergence has moved to beyond the reference point, each of the image stabilizer lenses 114a and 114b has a movable range which is horizontally asymmetric with respect to their center position. More specifically, the movable range of the image stabilizer lens 114a of the OIS 112a (i.e., the right lens) is defined by a distance b from the center position of the image stabilizer lens 114a to the left but by a distance c from the center position of the image stabilizer lens 114a to the right. On the other hand, the movable range of the image stabilizer lens 114b of the OIS 112b (i.e., the left lens) is defined by the distance c from the center position of the image stabilizer lens 114b to the left but by the distance b from the center position of the image stabilizer lens 114b to the right.

As described above, since the image stabilizer lenses 114a and 114b of the right and left OIS's 112a and 112b need to have image stabilization working ranges that agree with each other, the controller 210 defines the image stabilization working range of each of the image stabilizer lenses 114a, 114b by the shorter one of the left and right halves of their movable range. In the state shown in FIG. 5, the image stabilizer lens 114a (right lens) has a movable range, of which the left half defined by the distance b is shorter than the right half defined by the distance c. That is why the controller 210 defines the image stabilization working range by the distance b. As a result, the image stabilization working range of the image stabilizer lens 114a (right lens) is controlled so as to be defined by the distance b on both of the left- and right-hand sides. In the same way, the image stabilization working range of the image stabilizer lens 114b (left lens) of the OIS 112b is also controlled so as to be defined by the distance b on both of the left- and right-hand sides.

By performing the operation described above, the digital camcorder 1 of this embodiment can also cancel a camera shake appropriately even if the image stabilizer lenses 114 have been shifted so that the point of convergence is located more distant than the reference point is.

Figure 6:
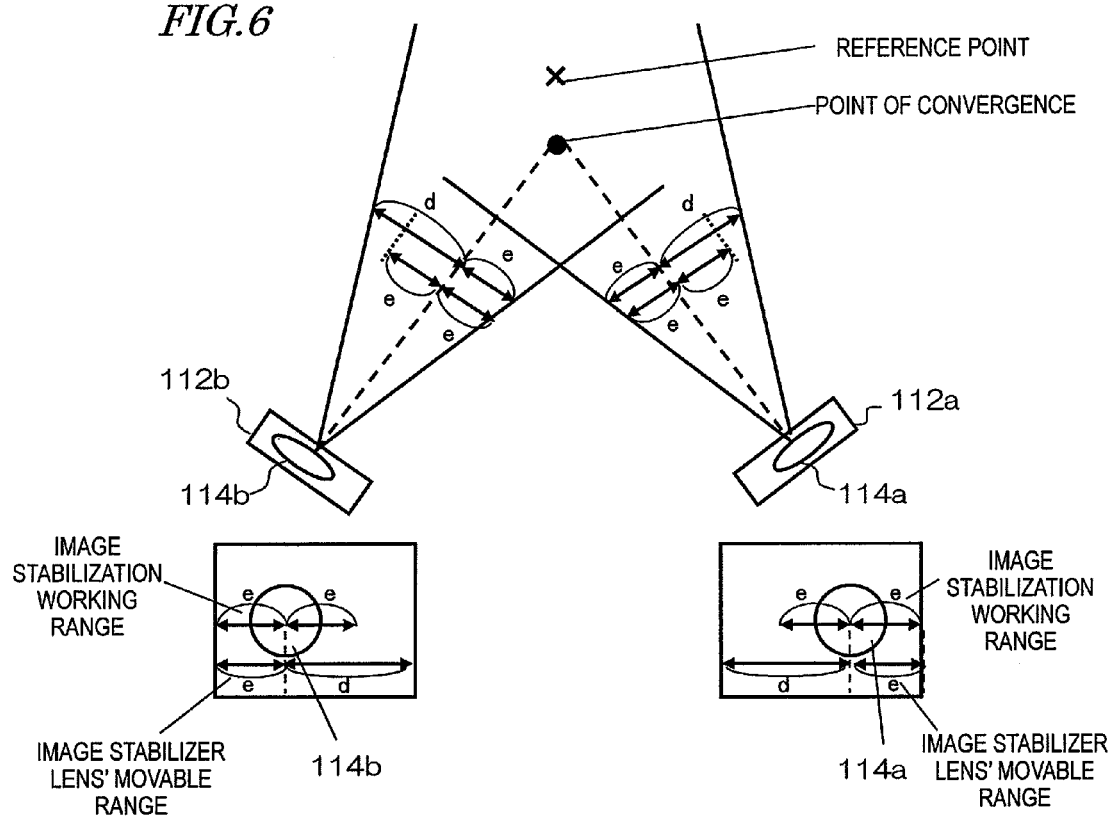
FIG. 6 illustrates conceptually the movable ranges of the left and right image stabilizer lenses and their image stabilization working ranges when the point of convergence is located closer to the sensor than the reference point is.

FIG. 6 illustrates conceptually the movable ranges of the right and left image stabilizer lenses 114a and 114b and their image stabilization working ranges when the point of convergence is located closer to the sensor than the reference point is.

By turning the operating dial in the shooting mode, the user can bring the point of convergence closer to the sensor than the reference point is. This operation can be said to be the operation of changing the subjects to produce no parallax on the 3D image from a subject located at the reference point into a subject located closer to the sensor than the reference point is. By performing this operation, a subject which is located closer to the sensor than the reference point is can be sensed to be less projecting. As a result, the stereoscopic impression of such a subject can be reduced.

In adjusting the point of convergence, the controller 210 also receives a user's instruction through the operating dial included in the operating member 250, and sends a control signal instructing that the image stabilizer lenses 114 be shifted to the OIS actuator 130. By shifting the image stabilizer lenses 114 in accordance with the control signal, the OIS actuator 130 changes the position of the point of convergence. In changing the position of the point of convergence, the controller 210 also changes the image stabilization working ranges with the movement of the point of convergence.

As shown in FIG. 6, if the point of convergence has become closer to the sensor than the reference point is, each of the image stabilizer lenses 114 has a movable range that is horizontally asymmetric with respect to their center position. More specifically, the movable range of the image stabilizer lens 114a (i.e., the right lens) is defined by a distance d from its center position to the left but by a distance e from its center position to the right. On the other hand, the movable range of the image stabilizer lens 114b (i.e., the left lens) is defined by the distance e from its center position to the left but by the distance d from its center position to the right.

As described above, since the image stabilizer lenses 114a and 114b of the right and left OIS's 112a and 112b need to have image stabilization working ranges that agree with each other, the controller 210 defines the image stabilization working range of each of the image stabilizer lenses 114a, 114b by the shorter one of the left and right halves of their movable range. In the state shown in FIG. 6, the image stabilizer lens 114a (right lens) of the OIS 112a has a movable range, of which the right half defined by the distance e is shorter than the left half defined by the distance d. That is why the controller 210 defines the image stabilization working range by the distance e. As a result, the image stabilization working range of the image stabilizer lens 114a (right lens) of the OIS 112a is controlled so as to be defined by the distance e on both of the left- and right-hand sides. In the same way, the image stabilization working range of the image stabilizer lens 114b (left lens) of the OIS 112b is also controlled so as to be defined by the distance e on both of the left- and right-hand sides.

By performing the operation described above, the digital camcorder 1 of this embodiment can also cancel a camera shake appropriately even if the image stabilizer lenses 114 have been shifted so that the point of convergence is located closer to the sensor than the reference point is.

Figure 7:
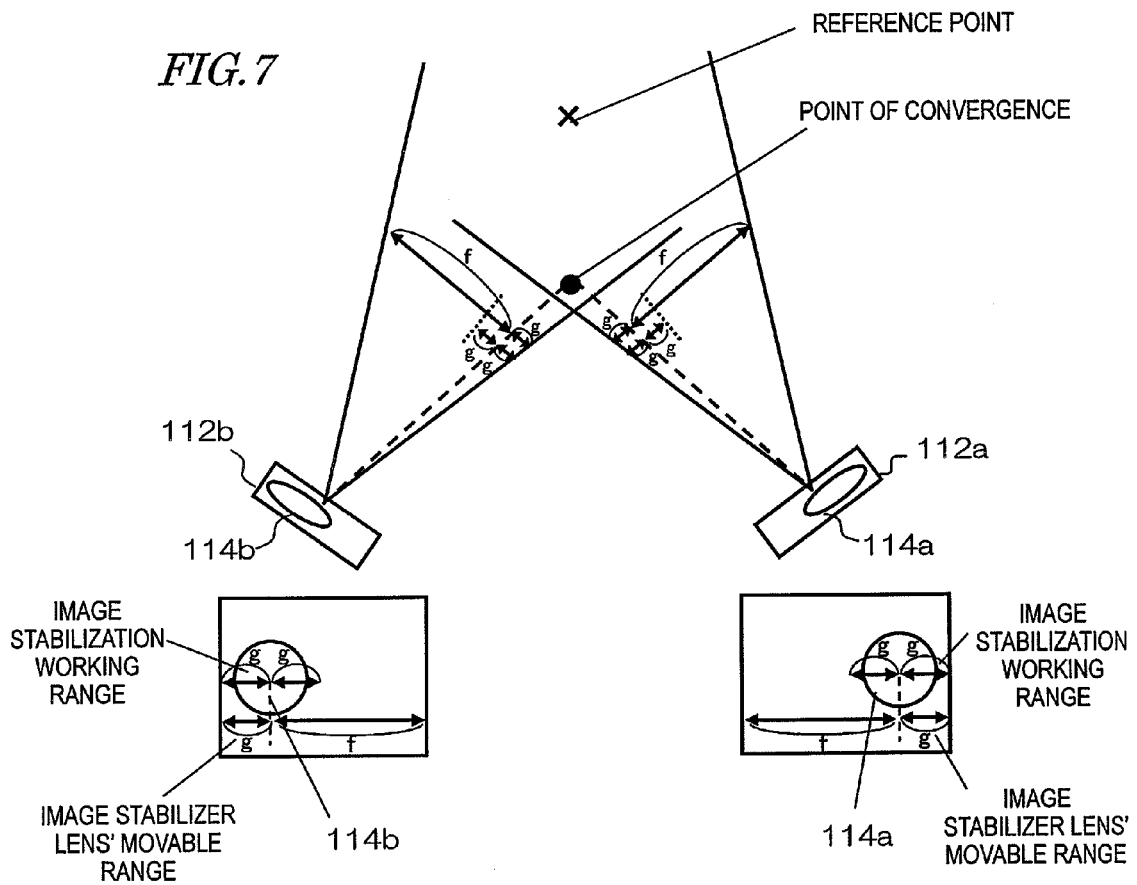
FIG. 7 illustrates conceptually the movable ranges of the left and right image stabilizer lenses and their image stabilization working ranges when the mode of operation is set to be a macro shooting mode.

FIG. 7 illustrates conceptually the movable ranges of the right and left image stabilizer lenses 114a and 114b and their image stabilization working ranges when the mode of operation is set to be a macro shooting mode, in which the point of convergence is located even closer to the sensor than in the example shown in FIG. 6.

By turning the operating dial, the user can bring the point of convergence even closer to the sensor than in the example shown in FIG. 6. Also, the digital camcorder 1 of this embodiment has a user setting button. In a situation where a macro shooting mode is one of the options that can be selected with a user setting button, when the user presses down the user setting button, the mode of operation changes directly into the macro shooting mode. The controller 210 sends a control signal instructing that the image stabilizer lenses 114 be shifted to the OIS actuator 130. In response to the control signal, the OIS actuator 130 shifts the image stabilizer lenses 114, thereby changing the position of the point of convergence. As a result, the respective image stabilizer lenses 114a and 114b of the OIS's 112a and 112b fall into the state shown in FIG. 7. In this case, the controller 210 also changes the image stabilization working ranges with the change of the point of convergence.

As shown in FIG. 7, in the macro shooting mode, each of the image stabilizer lenses 114 has a movable range that is horizontally asymmetric with respect to its center position. More specifically, the movable range of the image stabilizer lens 114a of the OIS 112a (i.e., the right lens) is defined by a distance f from its center position to the left but by a distance g from its center position to the right. On the other hand, the movable range of the image stabilizer lens 114b of the OIS 112b (i.e., the left lens) is defined by the distance g from its center position to the left but by the distance f from its center position to the right.

As described above, since the image stabilizer lenses 114a and 114b of the right and left OIS's 112a and 112b need to have image stabilization working ranges that agree with each other, the controller 210 defines the image stabilization working range of each of the image stabilizer lenses 114a, 114b by the shorter one of the left and right halves of their movable range. In the state shown in FIG. 7, the image stabilizer lens 114a (right lens) of the OIS 112a has a movable range, of which the right half defined by the distance g is shorter than the left half defined by the distance f. That is why the controller 210 defines the image stabilization working range by the distance g. As a result, the image stabilization working range of the image stabilizer lens 114a (right lens) of the OIS 112a is controlled so as to be defined by the distance g on both of the left- and right-hand sides. In the same way, the image stabilization working range of the image stabilizer lens 114b (left lens) of the OIS 112b is also controlled so as to be defined by the distance g on both of the left- and right-hand sides.

In the macro shooting mode, in order to shoot a subject which is located at a short subject distance (as measured from the camera), the image stabilizer lenses 114a and 114b (right and left lenses) of the OIS's 112a and 112b are shifted to the vicinity of the nearest possible positions where the point of convergence can still be set. In this case, if the point of convergence were moved to the physically movable nearest possible position, then the image stabilizer lenses of the OIS's 112a and 112b would lose their image stabilization working ranges. For that reason, in the digital camcorder 1 of this embodiment, a limit value is defined with respect to the image stabilization working range in order to cancel the camera shake even in the macro shooting mode. This limit value is defined to be a value at and over which the image stabilization function works fine as long as the user holds the digital camcorder 1 while standing still without walking or moving. Consequently, in the digital camcorder 1 of this embodiment, even if the image stabilizer lenses 114a and 114b of the OIS's 112a and 112b are shifted in order to move the point of convergence in the macro shooting mode, the lenses 114a and 114b still fall within the image stabilization working ranges, and therefore, the camera shake can be canceled as intended.

By performing the operation described above, the digital camcorder 1 of this embodiment can also cancel a camera shake appropriately even in the macro shooting mode.

In the embodiment described above, the point of convergence is supposed to be adjusted and the camera shake is supposed to be canceled using the image stabilizer lenses 114 which are shifted perpendicularly to the optical axes. However, this is just an example and this configuration does not have to be adopted. Alternatively, the point of convergence may also be adjusted and the camera shake may be canceled by rotating the optical systems as disclosed in Patent Document No. 2. In that case, any optical arrangement may be adopted to adjust the point of convergence and to cancel the camera shake.

As can be seen from the foregoing description, the digital camcorder 1 of this embodiment includes optical systems 110, CCD image sensors 150, a controller 210, and an OIS actuator 130. The controller 210 sets image stabilization working ranges appropriately according to the position of a point of convergence. The OIS actuator 130 drives the image stabilizer lenses 114 included in the optical systems 110 within the working ranges that have been set. As a result, even if the point of convergence is moved from a reference point, a camera shake can also be canceled appropriately.

Other Embodiments

Although Embodiment 1 has been described herein as just an example of the technique of the present disclosure, various modifications, replacements, additions or omissions can be readily made on that embodiment as needed and the present disclosure is intended to cover all of those variations. Thus, some of those other embodiments will be described below.

<2-1. Sensor Shifting Method>

In the first embodiment described above, the position of the point of convergence is supposed to be adjusted with respect to the reference point by shifting the image stabilizer lenses 114a and 114b of the OIS's 112a and 112b. However, this is just an example of the technique of the present disclosure. Alternatively, the position of the point of convergence may also be adjusted with respect to the reference point by shifting the CCD image sensors 150a and 150b instead of the image stabilizer lenses 114a and 114b. In that case, the camera shake can also be canceled by shifting the CCD image sensors 150 instead of the image stabilizer lenses 114a and 114b. No matter whether the image stabilizer lenses 114a and 114b or the CCD image sensors 150 are shifted, the entire images on the image capturing planes of the CCD image sensors 150 can be shifted, which is the same effect achieved in both of these two cases. That is why these two operations are almost equivalent to each other and interchangeable with each other. In this description, the latter method in which image sensors such as the CCD image sensors 150 are shifted will be sometimes referred to herein as a "sensor shifting method", while the former method in which the image stabilizer lenses 114 are shifted as in the first embodiment will be sometimes referred to herein as a "lens shifting method". And these two methods will be sometimes collectively referred to herein as "optical methods".

Figure 8:
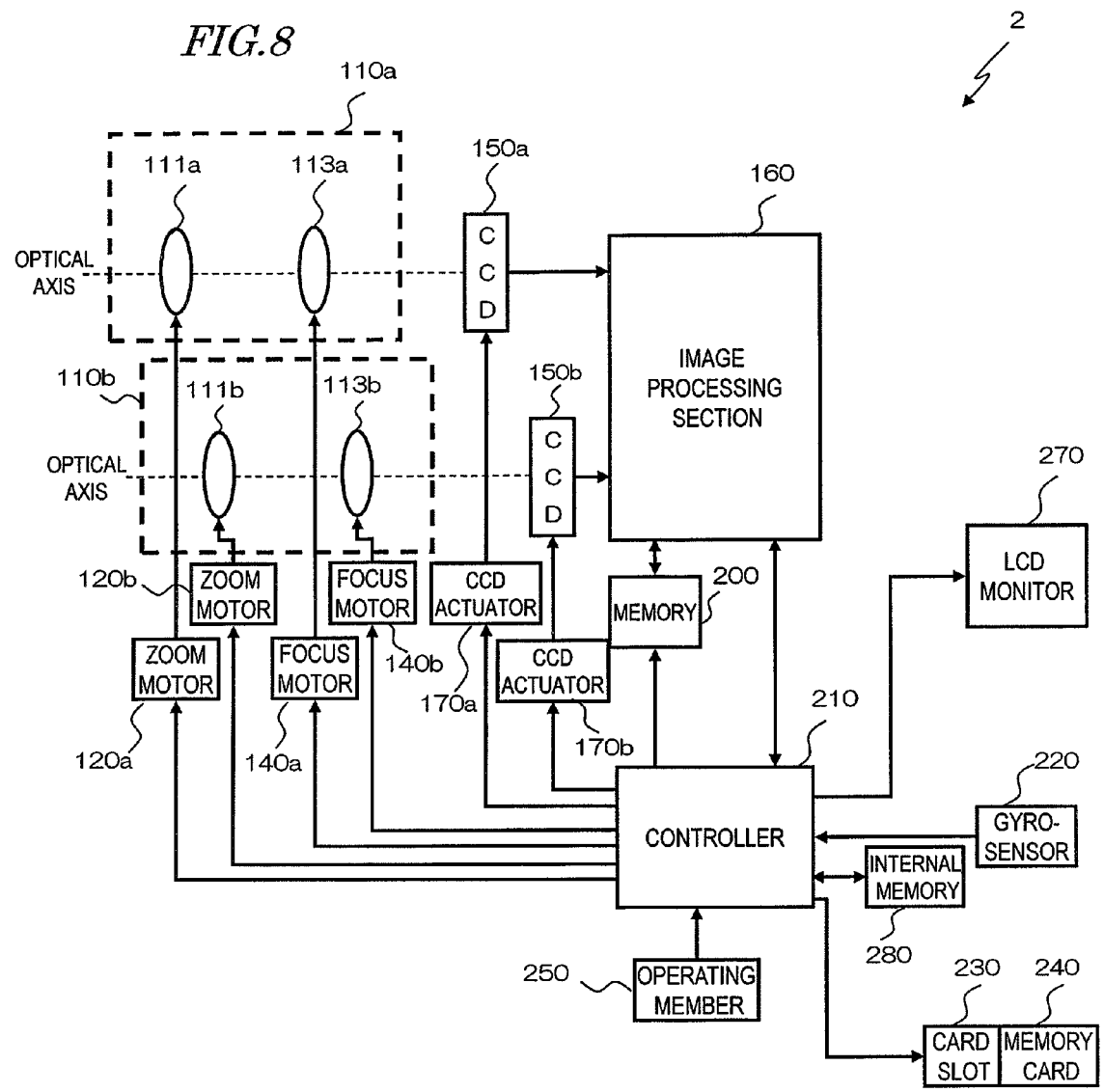
FIG. 8 is a block diagram illustrating an electrical configuration for a digital camcorder 2 which adopts a sensor shifting method.

FIG. 8 is a block diagram illustrating an exemplary configuration for a digital camcorder 2 which adjusts a point of convergence and cancels a camera shake by the sensor shifting method. In this exemplary configuration, the OIS's 112 and the OIS actuator 130 are omitted from the configuration shown in FIG. 1B but instead CCD actuators 170a and 170b are provided in order to drive the COD image sensors 150a and 150b, respectively. The CCD actuators 170a and 170b may be implemented as ultrasonic motors, for example. In accordance with an instruction given by the controller 210, the CCD actuators 170a and 170b drive and control portions of the CCD image sensors 150a and 150b, including their image capturing planes, within planes that intersect with the optical axes at right angles. By performing the same control as in the first embodiment, the controller 210 gets the CCD image sensors 150a and 150b shifted by the CCD actuators 170a and 170b. In this manner, the point of convergence can be adjusted and the camera shake can be canceled in the same way as in the first embodiment described above.

In this embodiment, the controller 210 also sets the image stabilization working ranges based on a result of adjustment of the point of convergence. That is to say, the controller 210 sets a range in which each of the CCD image sensors 150 may be shifted to cancel the camera shake within the range in which the CCD image sensor 150 is physically movable (i.e., within its movable range), and gets the CCD image sensor 150a, 150b driven by the CCD actuator 170a, 170b within the former range.

In this embodiment, a combination of the CCD actuators 170a and 170b and the controller 210 functions as a point of convergence adjusting section and an image stabilizing section.

<2-2. Electronic Method>

In the embodiment described above, the point of convergence is supposed to be adjusted with respect to the reference point by an optical method, i.e., by shifting either the image stabilizer lenses 114a and 114b of the OIS's 112a and 112b or the CCD image sensors 150a and 150b. However, this is just an example of the present disclosure. Alternatively, the point of convergence may also be adjusted with respect to the reference point by an electronic method. For example, the point of convergence may also be adjusted with respect to the reference point by adjusting (i.e., shifting) the cropping positions of left- and right-eye images. No matter whether the image stabilizer lenses 114a and 114b or the CCD image sensors 150 are shifted or the cropping positions are shifted, the entire images are slid in one direction, which is the same effect achieved in any of these three cases. That is why these processing steps are almost equivalent to each other and the optical and electronic methods are interchangeable with each other.

Figure 9:
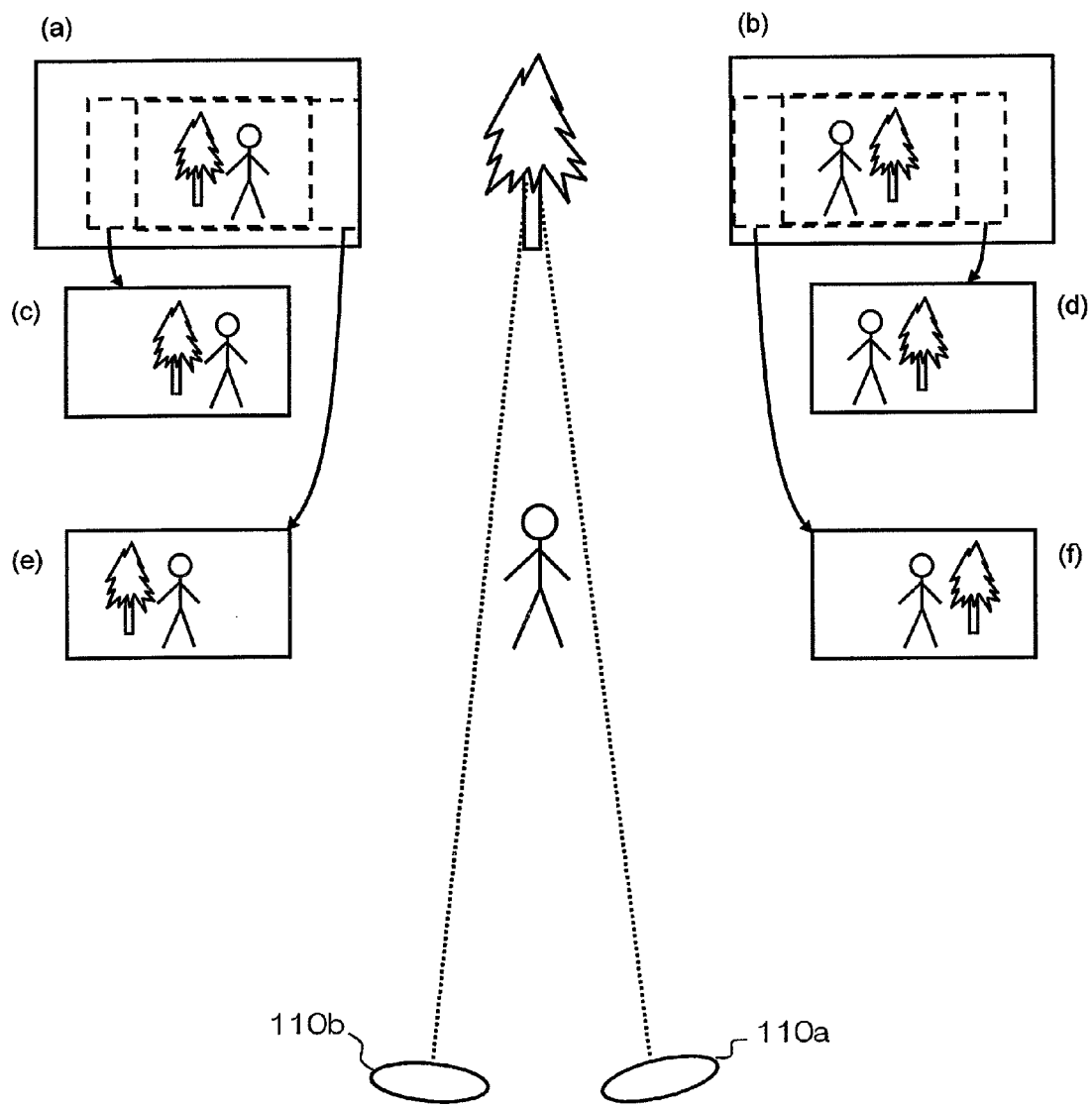
FIG. 9 illustrates conceptually and generally how to adjust the point of convergence by an electronic method.

FIG. 9 illustrates conceptually how to adjust the point of convergence by the electronic method. In FIG. 9, each of the optical systems 110a and 110b is illustrated as a single lens for the sake of simplicity. In this example, the respective optical axes of the optical systems 110a and 110b intersect with each other on a tree which is located behind a person. Portions (a) and (b) of FIG. 9 illustrate exemplary images to be represented by image signals output from the CCD image sensors 150a and 150b in such a state. In portions (a) and (b) of FIG. 9, the dashed rectangle indicates an exemplary cropping area to be extracted by the image processing section 160.

Portions (c) and (d) of FIG. 9 are images which are based on the image areas cropped from portions (a) and (b) of FIG. 9 and which indicate that the point of convergence is located on the tree. On the other hand, portions (e) and (f) of FIG. 9 are images which are also based on the image areas cropped from portions (a) and (b) of FIG. 9 but which indicate that the point of convergence is located on the person. By changing the positions of the image cropping areas from the ones indicated in portions (c) and (d) of FIG. 9 into the ones indicated in portions (e) and (f) of FIG. 9, the position of the point of convergence can be moved from a point on the tree into a point on the person.

In addition, the camera shake can also be canceled by some electronic method. If the camera shake is canceled by shifting the image cropping area, too (i.e., if the camera shake is canceled by an electronic method), the working ranges that can be used to make the electronic image stabilization become shorter as the left and right image cropping positions are shifted through adjustment of the point of convergence. That is why as in the embodiment that adopts the optical method, the controller 210 also performs a control so that the left and right electronic image stabilization working ranges agree with each other. Specifically, the ranges in which the left and right image cropping areas are shifted are set to be the working ranges. In this embodiment, each of the working ranges may be represented by a numerical value indicating the number of pixels that can be shifted, for example. In this case, the point of convergence is a concept to be determined virtually by the left and right cropping areas and refers to a point where the parallax becomes equal to zero on the images represented by the left and right cropping areas. By performing such a control, even when an electronic method is adopted, the camera shake can also be canceled appropriately with the point of convergence moved and adjusted.

Figure 10:
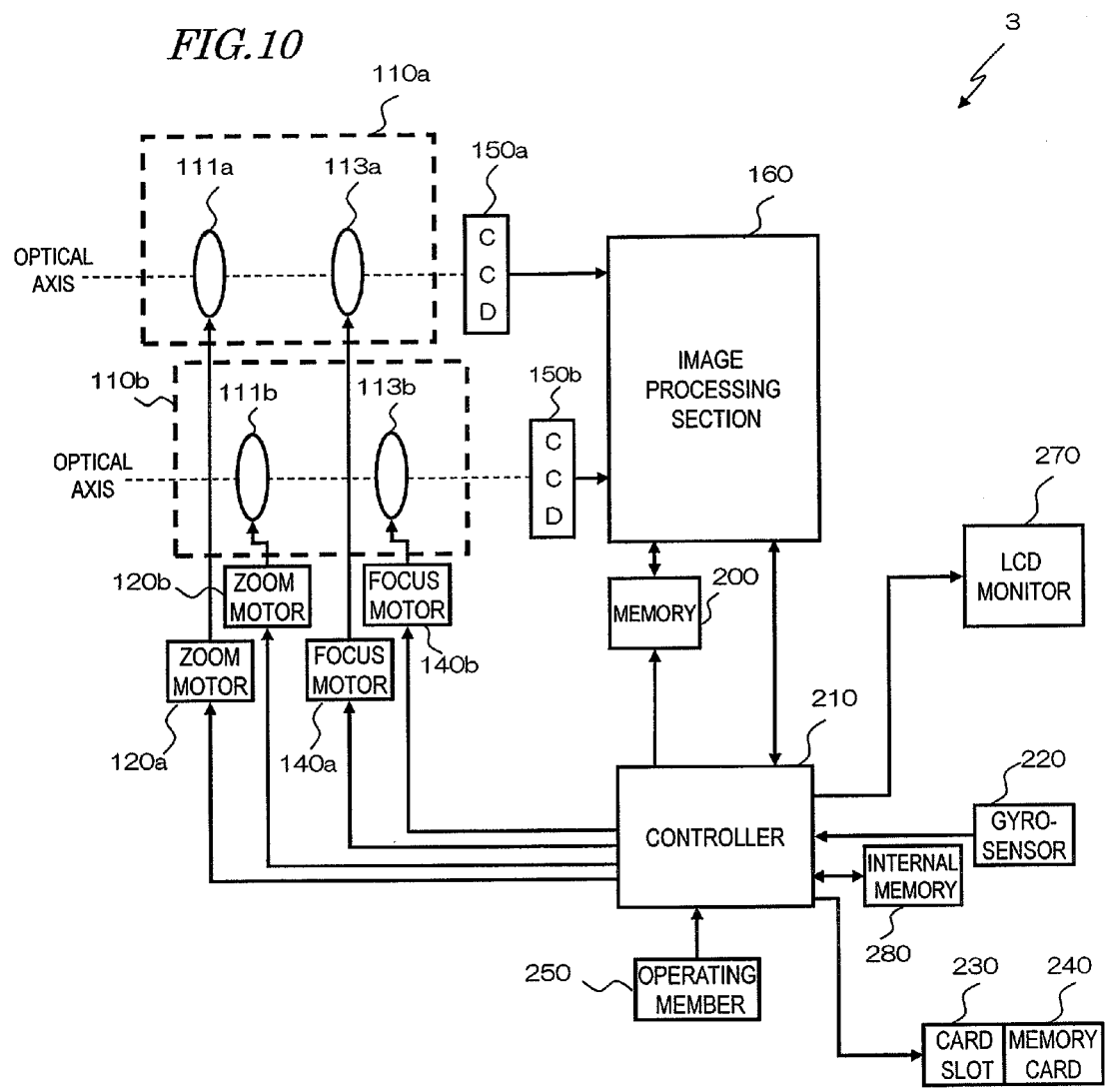
FIG. 10 is a block diagram illustrating an electrical configuration for a digital camcorder 3 which adopts an electronic method.

FIG. 10 is a block diagram illustrating an exemplary configuration for a digital camcorder 3 which adjusts the point of convergence and cancels the camera shake by such an electronic method. In this exemplary configuration, the OIS's 112, the OIS actuator 130, and the COD actuators 170 are omitted. Instead, the point of convergence is adjusted and the camera shake is canceled by the image processing section 160 under the control of the controller 210. That is to say, a combination of the image processing section 160 and the controller 210 functions as a point of convergence adjusting section and an image stabilizing section.

<2-3. Other Methods>

Optionally, the optical and electronic methods described above may be used in combination. For example, the point of convergence may be adjusted and the camera shake may be canceled by a combination of optical and electronic methods. Patterns A through E shown in FIG. 11 are exemplary combinations of a method for adjusting the point of convergence and a method for canceling the camera shake.

In FIG. 11, Pattern A in which the point of convergence adjustment and image stabilization are both carried out by the lens shifting method corresponds to the method that has been described as an example for the first embodiment. Pattern B in which the point of convergence adjustment and image stabilization are both carried out by the sensor shifting method corresponds to the method that has been described in the section <2-1>. Pattern C in which the point of convergence adjustment and image stabilization are both carried out by an electronic method corresponds to the method that has been described in the section <2-2>. Any of these patterns may be replaced with Pattern D in which the point of convergence adjustment and image stabilization are carried out by the lens shifting method and the electronic method in combination or Pattern E in which the point of convergence adjustment and image stabilization are carried out by the sensor shifting method and the electronic method in combination.

Furthermore, not only the patterns shown in FIG. 11 but also patterns in which the left and right image capturing sections (including optical systems and image sensors) use mutually different methods may also be adopted. For example, a configuration in which one image capturing section carries out point of convergence adjustment and image stabilization optically and the other image capturing section carries out point of convergence adjustment and image stabilization electronically may also be adopted. Even if the image capturing sections are configured horizontally asymmetrically in this manner, the method of controlling the image stabilization working ranges according to the position of the point of convergence according to the present disclosure is also applicable. Still alternatively, a configuration in which each image capturing section uses the lens shifting method and the sensor shifting method in combination may also be adopted.

Furthermore, according to Pattern C in which the point of convergence adjustment and image stabilization are both carried out by the electronic method, such a two-lens image capturing system does not always have to be used. Even if a so-called "single-lens 3D arrangement" is adopted, the control described above can also be carried out by performing image processing.

It should be noted that in a configuration that adopts the lens shifting method as in the first embodiment, the image stabilization working ranges become so narrow in the macro shooting mode in which the position of the point of convergence is set at the nearest possible distance that the camera shake cannot be canceled sufficiently in some cases. In that case, if the electronic point of convergence adjustment is used in combination, the macro shooting session can be carried out with sufficiently broad image stabilization working ranges secured. According to such a configuration, a macro shooting session can be carried out even beyond the close-up limit according to the lens shifting method, which is also beneficial.

<2-4. Lens Control Device>

Even though embodiments of a digital camcorder have been described in the foregoing description, those are just examples of the present disclosure. Alternatively, the present disclosure is also applicable to an interchangeable lens as long as the lens has a lens control device which includes: a first optical system which has a first optical axis and which includes a first image stabilizer lens that is configured to be able to shift in a direction that intersects with the first optical axis; a second optical system which has a second optical axis that intersects with the first optical axis and which includes a second image stabilizer lens that is configured to be able to shift in a direction that intersects with the second optical axis; a point of convergence adjusting section which changes the position of a point of convergence by shifting the first and second image stabilizer lenses; a working range setting section which sets image stabilization working ranges to cancel a camera shake with respect to the point of convergence; and an image stabilizing section which cancels a camera shake during shooting by shifting the first and second image stabilizer lenses within the working ranges that have been set.

<2-5. Control Program>

Furthermore, the present disclosure is also applicable to a control program to be used by a 3D image capture device which can adjust the point of convergence and cancel the camera shake. FIG. 12 is an exemplary flowchart showing the general procedure of the operation defined by such a program.

In this example, first of all, in Step S1201, the decision is made whether or not an instruction to change the point of convergence has been issued. If the answer is YES, the process advances to Step S1202 to change the point of convergence. After that, in Step S1203, the image stabilization working ranges are set with respect to the point of convergence that has been changed. And then in Step S1204, shooting is carried out with the camera shake canceled within the working ranges.

Such a program may be distributed by being stored in a removable storage medium and may also be downloaded over telecommunications lines. By making a processor built in a 3D digital camera or a 3D camcorder execute such a program, the various operations of the embodiments described above can be carried out.

Various embodiments have been described as examples of the technique of the present disclosure by providing the accompanying drawings and a detailed description for that purpose. That is why the elements illustrated on those drawings and/or mentioned in the foregoing description include not only essential elements that need to be used to overcome the problems described above but also other inessential elements that do not have to be used to overcome those problems but are just mentioned or illustrated to give an example of the technique of the present disclosure. Therefore, please do not make a superficial decision that those inessential additional elements are indispensable ones simply because they are illustrated or mentioned on the drawings or in the description.

Also, the embodiments disclosed herein are just an example of the technique of the present disclosure, and therefore, can be subjected to various modifications, replacements, additions or omissions as long as those variations fall within the scope of the present disclosure as defined by the appended claims and can be called equivalents.

The present disclosure is broadly applicable for use in any kind of image capture device to capture a 3D image, not just in digital camcorders. For example, the present disclosure can be used in digital still cameras and mobile electronic devices with camera, too.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A 3D image capture device which adjusts a point of convergence and working ranges of image stabilization, the 3D image capture device comprising:
    a first optical system having a first optical axis and including a first image stabilizer lens;
    a first image sensor that is arranged to capture an image produced by the first optical system and that outputs a first signal to generate a first image;
    a second optical system having a second optical axis and including a second image stabilizer lens, the second optical system having parallax with respect to the first optical system;
    a second image sensor that is arranged to capture an image produced by the second optical system and that outputs a second signal to generate a second image;
    a first actuator that shifts the first image stabilizer lens in a direction which intersects with the first optical axis;
    a second actuator that shifts the second image stabilizer lens in a direction which intersects with the second optical axis; and
    a controller that controls the first and second actuators, wherein the controller:
        (i) sets a position of the point of convergence by controlling the first and second actuators to shift the first and second image stabilizer lenses;
        (ii) sets working ranges for the image stabilization according to the position of the set point of convergence, the working ranges being narrower than movable ranges in which the first and second image stabilizer lenses are physically movable; and
        (iii) shifts, when performing the image stabilization, the first and second image stabilizer lenses within the set working ranges by controlling the first and second actuators.

2. The 3D image capture device of claim 1, wherein the controller sets a working range in a first direction in respective planes in which the first and second image stabilizer lenses are movable to be the shorter one of respective distances over which the first and second image stabilizer lenses are movable in the first direction, and sets a working range in a second direction that is opposite to the first direction in the respective planes to be the shorter one of respective distances over which the first and second image stabilizer lenses are movable in the second direction.

3. The 3D image capture device of claim 1, wherein the controller sets left and right image stabilization working ranges according to the position of the point of convergence so that their working ranges agree with each other.

4. A 3D image capture device which adjusts a point of convergence and working ranges of image stabilization, the 3D image capture device comprising:
  a first optical system having a first optical axis;
  a first image sensor that is arranged to capture an image produced by the first optical system and that outputs a first signal to generate a first image;
  a second optical system having a second optical axis and having parallax with respect to the first optical system; and
  a second image sensor that is arranged to capture an image produced by the second optical system and that outputs a second signal to generate a second image;
  a first actuator that shifts the first image sensor in a direction which intersects with the first optical axis;
  a second actuator that shifts the second image sensor in a direction which intersects with the second optical axis; and
  a controller that controls the first and second actuators,
  wherein the controller:
    (i) sets a position of the point of convergence by controlling the first and second actuators to shift the first and second image sensors;
    (ii) sets working ranges for the image stabilization according to the position of the set point of convergence, the working ranges being narrower than movable ranges in which the first and second image sensors are physically movable; and
    (iii) shifts, when performing the image stabilization, the first and second image sensors within the set working ranges by controlling the first and second actuators.

5. The 3D image capture device of claim 4, wherein the controller sets a working range in a first direction in respective planes in which the first and second image sensors are movable to be the shorter one of respective distances over which the first and second image sensors are movable in the first direction, and sets a working range in a second direction that is opposite to the first direction in the respective planes to be the shorter one of respective distances over which the first and second image sensors are movable in the second direction.

6. A 3D image capture device which adjusts a point of convergence and working ranges of image stabilization, the 3D image capture device comprising:
  a first optical system having a first optical axis;
  a first image sensor that is arranged to capture an image produced by the first optical system and that outputs a first signal to generate a first image;
  a second optical system having a second optical axis and having parallax with respect to the first optical system; and
  a second image sensor that is arranged to capture an image produced by the second optical system and that outputs a second signal to generate a second image;
  an image processor that generates first image data by extracting a first image area from an image represented by the first signal and generates second image data by extracting a second image area from an image represented by the second signal;
  wherein the image processor:
    (i) sets a position of the point of convergence by determining the first and second areas;
    (ii) sets working ranges for the image stabilization according to the position of the set point of convergence, the working ranges being narrower than movable ranges in which the first and second image areas can be shifted; and
    (iii) shifts, when performing the image stabilization, the first and second areas within the set working ranges.

7. The 3D image capture device of claim 6, wherein the image processor sets a working range in a first direction in respective planes of the first and second image areas to be the shorter one of respective distances over which the first and second image areas are movable on their image in the first direction, and sets a working range in a second direction that is opposite to the first direction in the respective planes to be the shorter one of respective distances over which the first and second image areas are movable on their image in the second direction.

8. A lens control device, comprising:
  a first optical system having a first optical axis and including a first image stabilizer lens;
  a second optical system having a second optical axis that intersects with the first optical axis and including a second image stabilizer lens;
  a first actuator that shifts the first image stabilizer lens in a direction which intersects with the first optical axis;
  a second actuator that shifts the second image stabilizer lens in a direction which intersects with the second optical axis; and
  a controller that controls the first and second actuators,
  wherein the controller:
    (i) sets a position of a point of convergence by controlling the first and second actuators to shift the first and second image stabilizer lenses;
    (ii) sets working ranges for an image stabilization with according to the position of the set point of convergence, the working ranges being narrower than movable ranges in which the first and second image stabilizer lenses are physically movable; and
    (iii) shifts, when performing the image stabilization, the first and second image stabilizer lenses within the set working ranges by controlling the first and second actuators.

* * * * *